Jan. 25, 1966 F. P. KOKESH 3,231,041
APPARATUS FOR INVESTIGATING EARTH FORMATIONS
Filed June 30, 1958 3 Sheets-Sheet 2
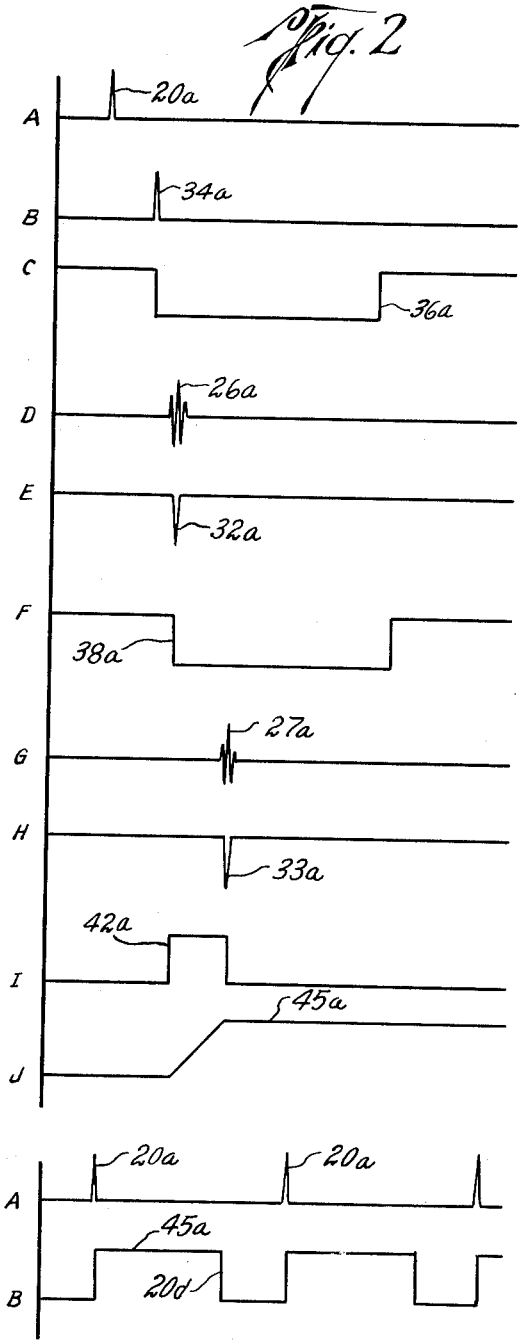
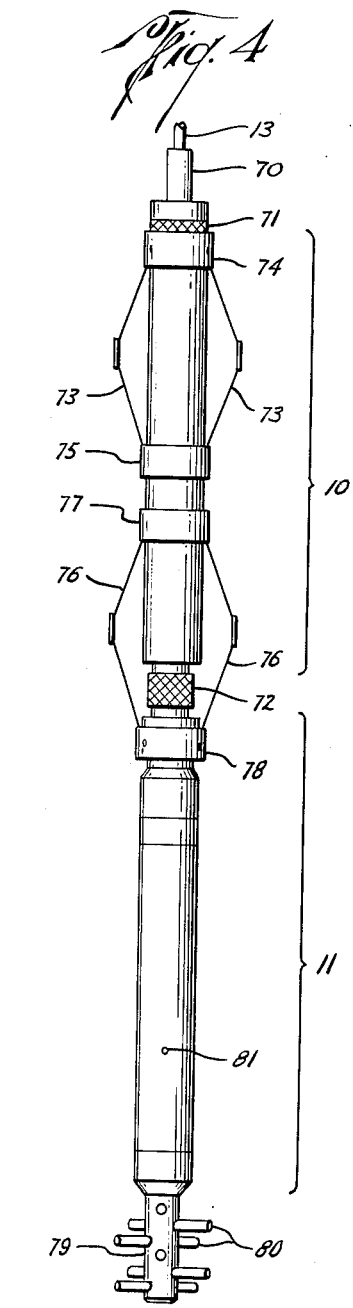
Frank P. Kokesh
INVENTOR.
BY Robert Hockfield
ATTORNEY

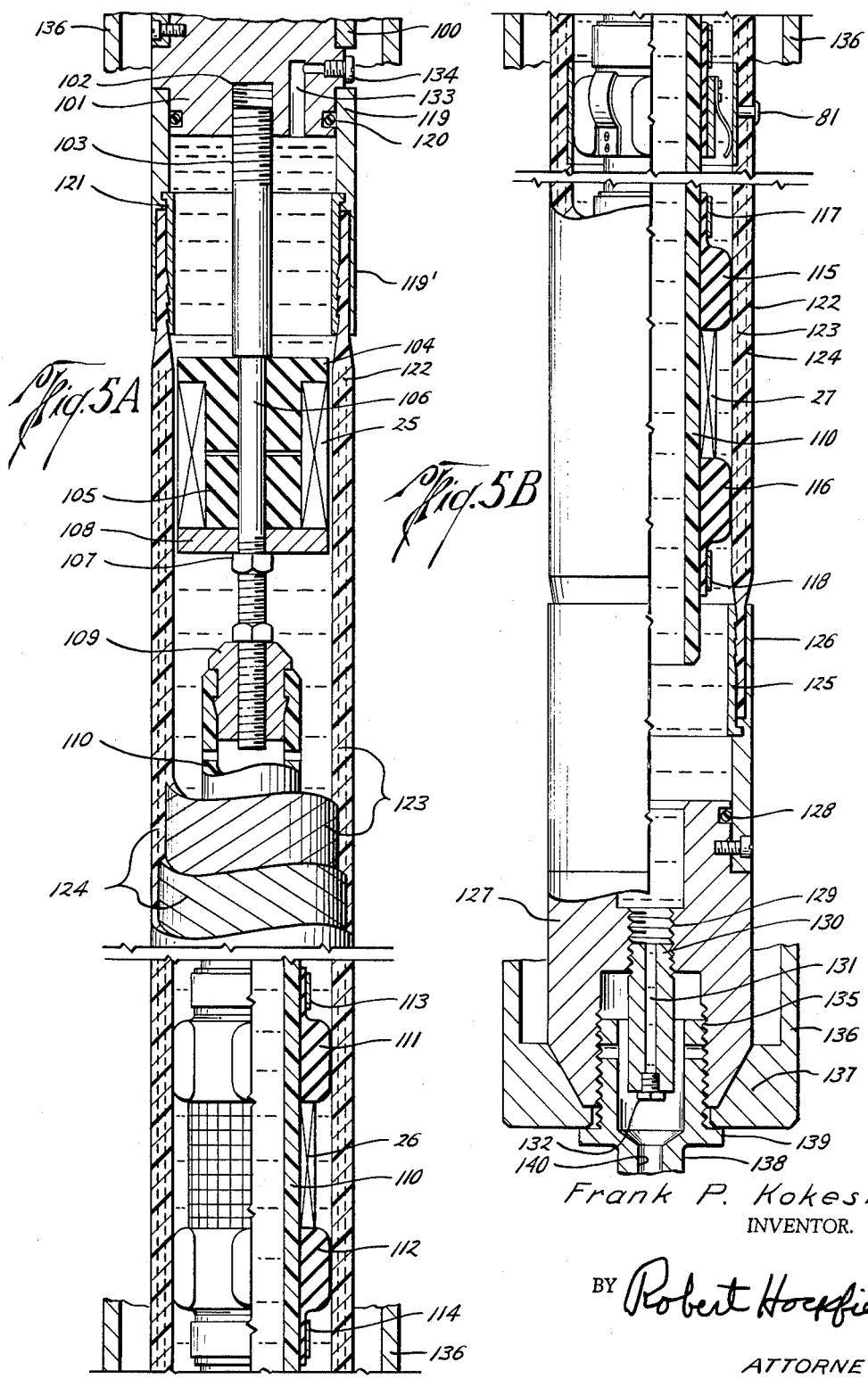

United States Patent Office 3,231,041
Patented Jan. 25, 1966

3,231,041
APPARATUS FOR INVESTIGATING EARTH FORMATIONS
Frank P. Kokesh, Houston, Tex., assignor to Schlumberger Well Surveying Corporation, Houston, Tex., a corporation of Texas
Filed June 30, 1958, Ser. No. 745,548
14 Claims. (Cl. 181—.5)

This invention relates to apparatus for investigating earth formations and, more particularly, pertains to new and improved apparatus for determining the seismic velocity of earth formations traversed by a well or a borehole.

To measure seismic or acoustic velocity, there is presently in use one form of apparatus including an acoustic energy transmitter and one or more transducers or receivers which are sensitive to acoustic energy that is propagated through the adjacent earth formations. The transmitter and receivers are lowered into a borehole and continuous measurements are made of the travel time of acoustic energy. In general, such apparatus has been used to obtain data for interpreting records obtained in seismic surveying. Moreover, acoustic velocity information has been found to be useful in many instances to determine the porosity of the earth formations with great accuracy. Accordingly, the apparatus has achieved a great measure of commercial success.

It is an object of the present invention to provide certain improvements in apparatus of the foregoing type.

Another object of the present invention is to provide new and improved apparatus for investigating earth formations of the type including a transmitter of pulses of acoustic energy and a pair of acoustic energy receivers wherein the response of the circuits connected to the receivers is less susceptible to extraneous actuation than heretofore possible.

Yet another object of the present invention is to provide a new and improved seismic velocity measuring apparatus which may be easily and conveniently calibrated both in a borehole and while at the surface of the earth.

Still another object of the present invention is to provide a new and improved transducer section for seismic velocity measuring equipment which is simple and relatively inexpensive to construct and yet is entirely efficient and reliable in operation.

In accordance with one aspect of the present invention, seismic velocity well logging apparatus comprises means for emitting acoustic energy in a borehole and means for intercepting acoustic energy at two locations spaced from the one location to derive respective pulse signals. Each of the signals is supplied to a respective one of a pair of signal translating circuits adapted to be actuated only in response to a control signal. A control pulse delay a predetermined time after a pulse of acoustic energy is emitted is applied to one of the translating circuits. This control pulse has a selected duration corresponding to the time interval in which an intercepted pulse is to be expected, and a signal derived in response to such an intercepted pulse initiates another control pulse which operatively conditions the other signal translating circuit for a duration corresponding to the time interval in which the intercepted pulse is expected to arrive at the second location. Output pulses from the translating circuits are fed to an indicator circuit to derive an indication in response to the timing relation between intercepted pulses.

To calibrate apparatus of the foregoing type, a pulse generator is coupled to the input circuits of both signal translating circuits and supplies repetitive pulses thereto. The first signal translating circuit is so conditioned that it will respond to one of the incoming pulses, but the other signal translating circuit remains insensitive until the first signal translating circuit has responded to an incoming pulse. Thus, a pair of time-spaced pulses is supplied from the signal translating circuits to the indicator thereby providing a calibrated time interval.

In accordance with another aspect of the present invention, the transducer section of acoustic velocity well logging apparatus is comprised of a support adapted to be lowered into a borehole. Depending from the support is a mandrel having at least a portion constructed of a material which has a relatively low acoustic velocity. Also connected to the support is a semirigid enclosure which is sealed to the support and encloses the mandrel. The lower end of the enclosure or housing is sealed to a bottom nose and the mandrel terminates a specified distance above the bottom nose. The mandrel supports one or more acoustic wave energy transducers which may be employed for emitting acoustic energy and for converting intercepted energy to electrical signals. A fluid fills the space within the housing.

The novel features of the present invention are set forth with particularity in the appended claims. The present invention, both as to its organization and manner of operation, together with further objects and advantages thereof, may best be understood by reference to the following description taken in connection with the accompanying drawings in which:

FIGS. 2 and 3 illustrate various wave forms in the circuit shown in FIG. 1 which are useful in explaining the operation of the apparatus;

FIG. 4 is a view in side elevation of a mechanical arrangement for carrying the portion of the apparatus shown in FIG. 1 that is lowered into a borehole; and FIGS. 5A and 5B are the upper and lower sections, respectively, of the transducer portion of the apparatus illustrated in FIG. 4, drawn to an enlarged scale and in partial longitudinal cross section.

Figure 1:
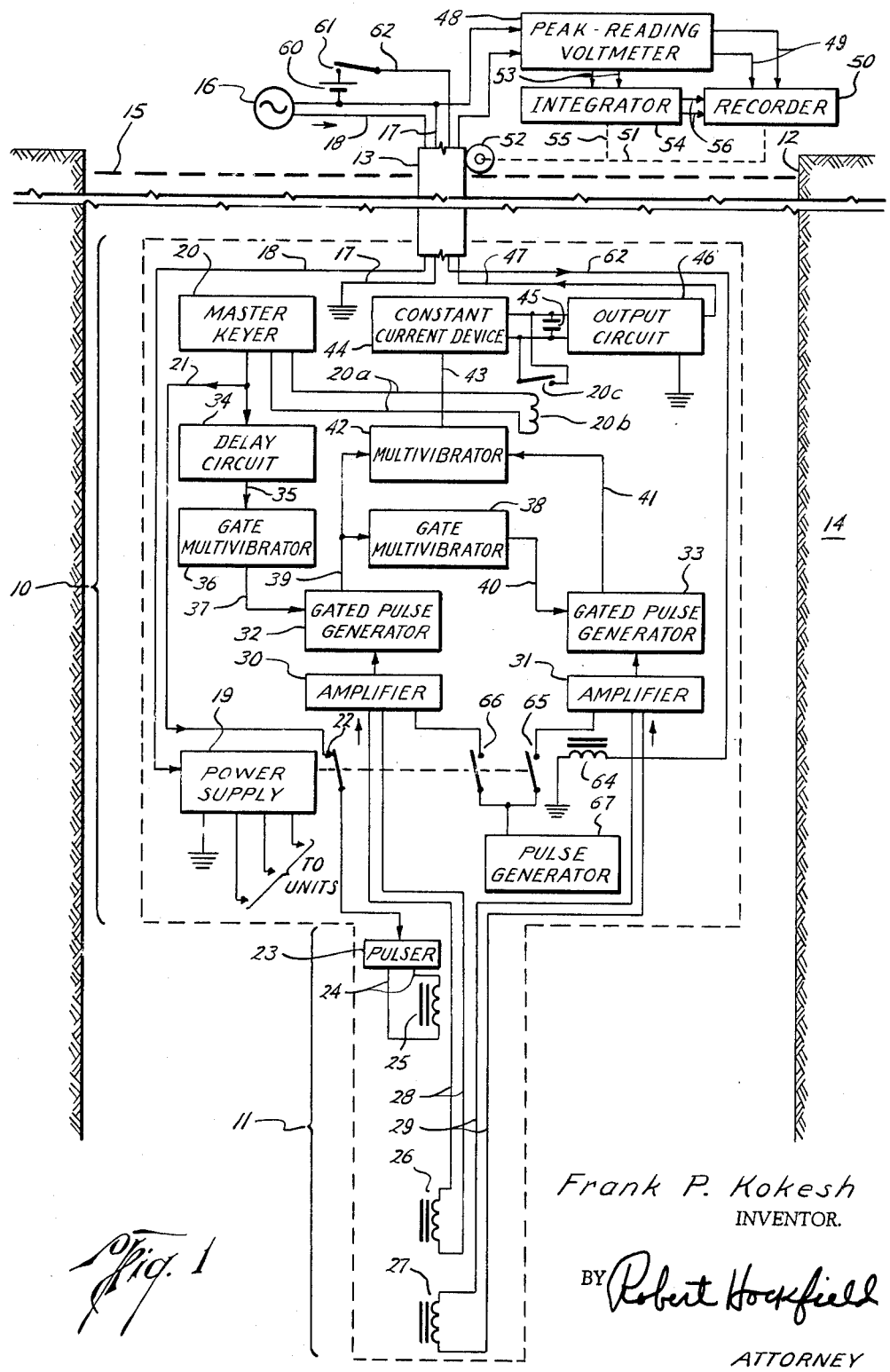
FIG. 1 is a sectional view of the earth and illustrating a schematic circiut diagram in block form of such acoustic well logging apparatus embodying one aspect of the present invention.

In FIG. 1 of the drawings, apparatus embodying the present invention is shown to comprise a borehole instrument including an upper, electronic section 10 and a lower transducer section 11 enclosed by appropriate pressure-tight housings capable of withstanding pressures normally encountered in the borehole 12 where the unit is suspended by means of an armored, electric cable 13. The borehole 12 penetrates earth formations 14 and by means of the cable 13 and a conventional winch (not shown) the unit 10, 11 may be passed through the borehole in order to obtain useful information concerning characteristics, such as acoustic velocity, of the earth formations 14. The borehole is filled with the usual drilling mud 15 which completes a sound transmission path between the transducer section 11 and the earth formations 14.

Electrical energy from an alternating current generator 16 at the surface of the earth is supplied via conductors 17 and 18 of cable 13 and appropriate ground connections to a conventional power supply 19 within electronic section 10. The power supply 19 converts the applied alternating current to unidirectional potentials of appropriate magnitudes for operating the various circuit elements within electronic section 10 and for energizing a pulser (to be described hereinafter) in section 11.

A master keyer 20 which may be a conventional free-running multivibrator or a multivibrator synchronized with the frequency of source 16 supplies repetitive master keyer pulses 20a at 100 millisecond timed intervals for example, over a conductor 21 through contacts 22 (whose function will be described hereinafter) to a conventional pulser 23. In synchronism with each applied pulse 20a, pulser 23 supplies a pulse of high current having a duration of, for example, one microsecond over leads 24 to a transmitting transducer 25 which may be of the magnetostriction type. Preferably, both the pulser 23 and the transducer 25 are located in the upper end of transducer section 11.

To derive electrical signals in response to acoustic energy a first receiving transducer 26 and a second receiving transducer 27 are positioned below the transmitter 25 in the recited order. The receivers 26 and 27 may be of the magnetostriction type and may be spaced from one another approximately one foot. The upper receiver 26 may be spaced from the transmitter 25 a distance of three feet. These distances, however, may be set at any desired values; thus, a spacing of three feet between the receivers may be employed. Alternatively, by using an additional receiver, multiple spacings may be employed on the same trip into a borehole.

The receivers 26 and 27 are coupled by leads 28 and 29 to respective pulse amplifiers 30 and 31 whose output circuits are coupled to individual gated pulse generators 32 and 33. These pulse generators are of conventional construction arranged so that no output signal is produced unless a control pulse is supplied to a control circuit.

To derive control pulses for generator 32, an extension of lead 21 from master keyer 20 is connected to the input circuit of a delay circuit 34 which provides a delay of approximately 140 microseconds. Delay circuit 34 is connected by a lead 35 to a conventional gate multivibrator 36 which generates a pulse 36a of approximately 700 microseconds duration that is supplied via a lead 37 to the control circuit of pulse generator 32. A gate multivibrator 38 that is similar to gate multivibrator 36 has its input circuit connected by a lead 39 to the output circuit of pulse generator 32, and its output circuit is connected by a lead 40 to the control circuit of a gated pulse generator 33. The purpose of this type of connection will be more apparent from the discussion to follow.

Output lead 39 of generator 32 and output lead 41 of generator 33 are connected to respective input circuits of a conventional multivibrator 42 which provides a pulse 42a whose duration is dependent upon the time interval between the pulses applied to its input circuit. The output circuit of multivibrator 42 is connected by a lead 43 to a constant current device 44 arranged to charge a condenser 45 in its output circuit in relation to the duration of each applied pulse 42a. Master keyer 20 is connected by leads 20a to the operating coil 20b of a relay having normally open contact 20c connected across condenser 45. The signal at leads 20 is arranged to be in the form of a pulse 20d which begins approximately 70 milliseconds after each master keyer pulse and of 30 milliseconds in duration. Accordingly, the condenser 45 is short circuited and is thus discharged and so remains during the 30 millisecond interval preceding each emitted pulse. At the condenser 45 there thus appears a pulse signal whose amplitude is dependent upon the duration of the pulse supplied by multivibrator 42. The condenser is connected to an output circuit comprised of a conventional amplifier and cathode follower (not shown), in turn connected by an insulated conductor 47 of cable 13 and appropriate ground connections to a conventional peak-reading voltmeter 48 at the surface of the earth. The voltmeter output is connected by leads 49 to a recorder 50 in which through a conventional linkage 51 and a measuring wheel 52 and the recording medium is transported in proportion to movement of cable 13. The voltmeter is also connected by means of leads 53 to an integrator 54 for integrating total travel time. This integrator may, for example, be of the ball-and-disc type in which the disc is coupled to and driven by measuring wheel 52 via a linkage 55. The position of the ball is determined in accordance with the output of peak-reading voltmeter 48. The integrator 54 may be arranged, for example, to provide an output pulse for each millisecond of travel time. The resulting pulses are applied to recorder 50 and their number when counted as a function of depth on the record represents integrated travel time.

In order to calibrate the equipment while in the borehole, a source of potential, such as a battery 60 at the surface, may be connected by a switch 61 to a cable conductor 62 that is connected to a relay coil 64 disposed within electronic unit 10. In the de-energized condition of the relay 64 contacts 22 are closed while a number of other contacts are open. By energizing the relay, contacts 22 are opened and a pair of contacts 65 and 66 closed thereby connecting a pulse generator 67 to the input circuits of amplifiers 30 and 31. The generator 67 may be a conventional crystal-controlled oscillator providing repetitive pulses at 300 microsecond intervals.

In describing the operation of the equipment thus far described, it is assumed that relay coil 64 is de-energized and that contacts 22 are closed while contacts 65 and 66 are open. The unit 10, 11 is lowered in the borehole by means of cable 13 and as it passes the adjacent formations 14 repetitive such pulses are emitted from transmitting transducer 25. The transducer 25 is actuated by the pulse 23 which is, in turn, actuated by an electrical pulse from master keyer 20. One such pulse 20a from master key 20 is represented in portion (A) of FIG. 2 in which the remaining wave forms are displayed along a common time scale.

The pulse 20a on lead 21 which operates pulser 23 thereby to generate a transmitted acoustic pulse is also supplied to delay circuit 34 and 140 microseconds later a pulse 34a as represented in FIG. 2B triggers multivibrator 36. As shown in FIG. 2C, the multivibrator 36 provides a negative-going pulse 36a whose leading edge is synchronized with the pulse 34a in FIG. 2B and whose trailing edge occurs 700 microseconds later. This control pulse 36a is supplied over lead 37 to condition pulse generator 32 for operation. Accordingly, when the signal representing the first received acoustic pulse 26a of acoustic energy, represented in FIG. 2D, is supplied by receiving transducer 26 to the amplifier 30, the amplified pulse causes generator 32 to generate an output pulse 32a at lead 39, as represented in FIG. 2E. This pulse 32a triggers multivibrator 38 and the resulting control pulse 38a (FIG. 2F) having its leading edge synchronized with the pulse 32a from generator 32 and its trailing edge occurring 700 microseconds later, is applied over lead 40 to the control circuit of pulse generator 33. Generator 33 is thus operatively conditioned and when the signal or acoustic pulse 27a representing acoustic energy incident upon receiving transducer 27 as shown in FIG. 2G, is translated by amplifier 31, generator 33 is triggered to provide a pulse 33a as represented in FIG. 2H. The pulse 32a of FIG. 2E which appears at lead 39 and the pulse 33a of FIG. 2H which appears at lead 41 are supplied to multivibrator 42 which generates the pulse 42a of FIG. 2I having a duration representing the time spacing between the applied pulses 32a, 33a. The latter pulse 42a is supplied to constant current device 44.

Constant current device 44 causes the condenser 45 to charge linearly and this occurs for the duration of each pulse 42a from the multivibrator 42. Accordingly, the condenser attains a charge voltage signal 45a as shown in FIG. 2J which is proportional to the duration of the pulse 42a of FIG. 2I. Thirty milliseconds before the next cycle of operation begins, the pulse (not shown) from master keyer 20 arrives via leads 20a to energize coil 20b thereby closing contact 20c and the condenser is discharged. These contacts open just prior to the next cycle of operation. The voltage signal 45a on condenser 45 is best seen in FIG. 3B (FIG. 3A represents the master keyer pulses 20a on a time scale which is considerably compressed relative to the scale of FIG. 2A).

It is evident that the charge voltage on condenser 45 represents the time interval between acoustic pulses received at transducers 26 and 27 and, of course, the reciprocal of this quantity represents the acoustic velocity of the adjacent earth formations. Circuit resistance across the condenser is kept to a maximum so that the condenser remains at the particular charge voltage until it is short circuited by contacts 20c. The foregoing cycle is repeated with each pulse 20a of FIG. 3A.

The pulses or voltage signals 45a of FIG. 3B are supplied via the output circuit 46 and cable conductor 47 to the peak-reading voltmeter 48 and the resulting voltage is supplied to the recorder 50. Thus, a continuous log is derived representing the acoustic velocity of the earth formations 14.

The integrator 54 provides a series of voltage pulses whose time spacing represents the integrated values of travel time. This voltage is also supplied to recorder 50 and the two records provide extremely useful data concerning the properties of earth formations 14.

Since the channel including pulse generator 33 is inoperative until a pulse passes into the channel including generator 32, it is impossible for extraneous or noise pulses at receiver transducer 27 or anywhere in the corresponding channel to be supplied to multivibrator 42. However, once an acoustic energy pulse is intercepted by receiving transducer 26, the resulting pulse 32a from generator 32 operates multivibrator 38 thereby operatively to condition the pulse generator 33 and the channel opens for the second arrival. It is thus evident that apparatus embodying the present invention is less subject to errors in velocity measurements resulting from extraneous signals in the channel including transducer 27 than heretofore possible.

By centering both the transmitter and the receivers, the wave front passing along the borehole wall is perpendicular to the borehole axis and as the energy is refracted into a receiver, all elemental sections of the cylindrical transducer are excited in phase. Accordingly, a stronger first arrival signal is afforded than otherwise possible.

To calibrate the equipment, operating switch 61 is closed thereby energizing relay 64. This opens contact 22 effectively to disable pulser 23 and thus acoustic energy is not emitted by transducer 25. At the same time, contacts 65 and 66 are closed and pulses from pulse generator 67 are supplied to the input circuits of amplifiers 30 and 31. The first pulse to arrive at amplifiers 30 and 31 is passed to the corresponding pulse generator but since generator 33 is normally disabled, this pulse has no effect on it. Pulse generator 32, however, has been conditioned for operation by the control pulse from multivibrator 36 which, in turn, was triggered, after a delay, by the immediately preceding master trigger pulse from keyer 20. Consequently, pulse generator 32 responds to this first pulse from generator 67 and provides a pulse at its output lead 39 which triggers multivibrators 38 and 42. The resulting control pulse from multivibrator 38 conditions generator 33 to be sensitive to an incoming pulse.

The second pulse in sequence from generator 67 passes through the amplifiers to the pulse generators 32 and 33, but does not affect the former because the recovery time from the preceding pulse is of sufficient duration. The second pulse, however, does trigger pulse generator 33 and the resulting pulse triggers multivibrator 42 back to its original state. Accordingly, a pulse of a duration representing the time spacing between the pulses from pulse generator 67 is supplied to the constant current device 44 and processed in the same manner as a pulse that is produced in normal logging operation. The next pair of pulses from generator 67 which follow the next delayed master trigger pulse cause a similar cycle of operation and thus, during a sequence of these cycles, a series of voltage pulses of fixed amplitude is developed on condenser 45.

The voltmeter 48 supplies to the recorder 50 a voltage of a constant value representing a velocity corresponding to a travel time of 300 microseconds for a given longitudinal spacing or "span" between receivers 26 and 27. Thus, for a span of three feet, the interval time is 100 microseconds per foot, corresponding to a velocity of 10,000 feet per second. The integrator 54 can be calibrated by operating it at this interval time over a predetermined depth interval.

It is thus evident that the apparatus of FIG. 1 which embodies the present invention may be easily calibrated in the borehole. If desired, when the equipment is at the surface, the unit 11 may be detached and, by means of appropriate connectors an external pulse generator may be connected to the input circuits of the amplifiers 30 and 31 for calibration in a similar manner, for example, at several values of pulse intervals.

A mechanical construction for the units 10 and 11 of FIG. 1 is illustrated in FIG. 4. As there shown, cable 13 is connected to a cable head 70 through which appropriate electrical connections can be made to equipment within the electronic section 10 which extends downwardly from the cable head and is connected thereto by the usual threaded connector 71. The upper end of transducer section 11 is of reduced diameter and is connected by a threaded connector 72 to the lower end of electronic section 10.

To center the apparatus in a borehole, bowed springs 73 in an upper set are connected at their ends to a collar 74 fixed to the upper end of the housing for section 10 and a collar 75 which is slidably disposed on the housing. Another set of bowed springs 76 are connected at their ends to a movable collar 77 positioned below movable collar 75 and to a collar 78 which is fixed to the upper end of transducer section 11. Threaded to the lower end of transducer section 11 is a rigid post 79 having a diameter smaller than the outer diameter of the transducer section. The post 79 is provided with a number of transverse openings angularly distributed about the longitudinal axis of the apparatus in vertically spaced relation with respect to one another. These openings rereceive respective ones of a plurality of resilient arms 80 which may be constructed of rubber and of sufficient rigidity to centralize the lower end of the apparatus, but sufficiently flexible to permit the unit 10, 11 to move through the borehole.

Transducer section 11 will be described in detail hereinafter in connection with FIGS. 5A and 5B and as will be seen preferably is comprised of a semirigid housing which may be constructed of an electrical insulating material. If desired, an electrode 81 may be disposed at the outer surface of this housing and connected by suitable conductors (not shown) that extend through the units 10 and 11 to an appropriate conductor of cable 13 for connection to an indicator at the surface of the earth. The electrode 81 thus may be employed for measuring spontaneous potentials in a known manner.

A transducer section embodying another aspect of the present invention is illustrated in FIGS. 5A and 5B. As there shown, the upper end of section 11 is comprised of a metallic housing 100 which receives an insert 101 of cylindrical configuration. A central opening 102 in the lower end of insert 101 receives the upper end of a threaded rod or mandrel 103. Transducer 25 is of the magnetostriction type of generally toroidal form and is disposed coaxially relative to the mandrel 103. Upper and lower rubber plugs 104 and 105 have central openings which receive a reduced section 106 of the rod 103 and a nut 107 threaded to the lower end of the rod maintains the assembly in fixed spacial relation against the shoulder formed between rod sections 103 and 106. Preferably, a shield disc 108 constructed, for example, of brass is interposed between the lower surface of plug 105 and the nut 107. The shield alters the first-energy acoustical output pattern of transducer 25 so that the lobe of negative polarity at the lower end of the transducer (relative to the positive annular lobe) is suppressed.

Threaded to the lower end of the rod 103 is an adapter 109 which firmly engages the inner surface of a mandrel extension in the form of a hollow, cylindrical rod or mandrel 110 of a material of relatively low acoustic velocity. The rod may be constructed of a plastic, such as a tetrafluoroethyelne, commonly referred to as Teflon, which has a predictable temperature-expansion characteristic and which is structurally stable with increasing temperature. In addition, the mandrel 110 should be unaffected by an oil medium which will be described hereinafter. Of course, any other material of like characteristics, such as an appropriate rubber, may be conveniently employed.

The mandrel 110 extends downwardly from adapter 109 and, as seen in FIG. 5B, magnetrostriction type transducers 26 and 27 of toroidal form receive the mandrel and are supported in coaxial relation therewith. Associated with transducer 26 are upper and lower generally-toroidal spacers 111 and 112 and the assembly of the transducer and its spacers is maintained in position on the mandrel by means of straps 113 and 114. Transducer 27 likewise is provided with spacers 115 and 116 and retaining straps 117 and 118. Obviously, the relative positions of the transducers 26 and 27 in relation to one another and to the transmitting tranducer 25 may be changed or adjusted with ease.

With reference again to FIG. 5A, a cylindrical member 119 closely receives member 101 and a conventional O ring 120 provides a fluid seal between these members. A depending portion 119' of member 119 and a collar 121 of somewhat reduced diameter provides a clamp for firmly engaging the upper end of a tubular enclosure or housing 122. This construction provides a fluid-tight connection between members 119 and 122 and the latter extends downwardly to enclose the mandrel 103, 110 and the transducers 25, 26 and 27.

Housing 122 preferably is semirigid and may be constructed of a synthetic rubber, such as Hycar, in which reinforcing metallic strands are embedded. These strands may be in one or more layers and may conveniently comprise an inner layer 123 and outer layer 124. The reinforcing strands may be constructed of steel, such as piano wire, wound in a helix about the axes of the section 11, the two layers being wound with opposite pitch. The embedding of the steel in the rubber and the curing of the assembly are accomplished in a well-known manner. Preferably, the pitch of the helix should be less than 54°40' so that the housing tends to shorten as the pressure inside the housing increases with respect to the pressure outside. Moreover, the sound velocity in a longitudinal direction through the reinforcing strands should be sufficiently lower than the lowest expected formation velocity. If 6000 feet per second is anticipated, the sound velocity through the strands should be on the order of 5000 feet per second or less and to meet both of the foregoing requirements a pitch of 32° has been found satisfactory.

As seen in FIG. 5B, the lower end of the housing 122 extends slightly below the lower end of mandrel section 110 and is clamped between inner cylindrical collar 125 and an outer cylindrical member 126 in fluid sealed relation. A cylindrical fitting 127 secured within the lower end of the member 126 is spaced from the lower end of mandrel section 110 so that the section is freely suspended within the housing. An O ring 128 provides a fluid seal between the members 126 and 127.

A central opening 129 in member 127 threadedly receives an adapter 130 having a central opening 131 arranged to be closed at its lower end by a screw plug 132. Opening 131 in the lower end of the unit together with an opening 133 in member 101 in the upper end of the unit (FIG. 5A) provides the means for introducing an appropriate fluid to fill the housing 122. The upper opening 133 is normally closed by a plug 134. Preferably, a fairly incompressible liquid is employed to fill the housing. A grade of SAE–10 oil, while not being completely incompressible, has been found suitable to match the sound transmission characteristic between the transducers, the housing 122 and the drilling mud in the borehole.

A lower extension of bottom nose 127 is provided with an enlarged central opening 135 which is larger than and concentric with the adapter 130. Opening 135 receives the upper end of post 79 (FIG. 4). This is the arrangement for a typical borehole operation.

When the equipment is brought out of the borehole, since the sleeve 122 is semirigid, it is desirable to protect the equipment. For this purpose, a sleeve 136 is employed. The sleeve 136 has an inner diameter somewhat greater than the outer diameter of housing 122, for a purpose to be described hereinafter, and a lower flange 137 seats on the lower surface of bottom nose 127 where it is held in place by a carrying handle 138. The handle is threaded into opening 135 and includes a flange 139 which engages the lower surface of flange 137. A central opening 140 extends through the carrying handle to permit drainage of fluid from protector tube 136 as the carrying handle is loosened. The protector tube 136 may be constructed of an aluminum alloy of appropriate strength and extends from the lower end of the unit 11 to a point adjacent to member 101 (FIG. 5A). Accordingly, the entire semirigid housing 122 is fully protected. In addition, by filling the annulus between the protector tube and the housing 122 with an appropriate liquid, such as water, the entire apparatus may be operated at the surface. The water provides a transmission path between the transducer assembly and the wall of the protector tube 136. The characteristic acoustic velocity of the tube can thus be measured and such measurements serve as a means of calibration. This, of course, is most convenient and may be easily accomplished at the well location with a minimum of difficulty.

In operation, of course, the protector tube 136 is removed and the post 79 with centralizing arms 80 is substituted for the carrying handle 138. It has been found in practice that although the housing 122 is only semirigid the apparatus functions quite effectively under all normal conditions. It is important to maintain the relative spacings among the transducers since the time measurements involved are relatively small and a very minor amount of movement would disturb the measurement. Because the Teflon mandrel section 110 has great dimensional stability, the relative positions of the transducers remain unchanged. Moreover, by filling the housing 122 with an incompressible liquid, pressure equilibrium is maintained as the pressure increases with borehole depth in the expected fashion.

With the pitch of the helices 123 and 124 at the selected angle of 32°, the housing 122 tends to shorten with increased pressure. This occurs as the usual increasing temperature with depth in the borehole increases the volume of the liquid. The spacing between the end of mandrel section 110 and the upper surface of bottom nose 127 is made sufficiently great so that at no time do these members engage. The spacers 111, 112, 115 and 116 maintain the coaxial relation between the mandrel section 110 and housing 122, but do not inhibit relative longitudinal movement. Accordingly, all compensation can take place as described. Further, it has been found that the apparatus will withstand a certain amount of shock as it encounters obstructions while going down hole.

The semirigid construction has thus been found to be quite satisfactory while obviously affording a great saving in cost of manufacture and ease of repair in contrast to prior constructional arrangements incorporating a rigid mandrel where the transducers usually are embedded or potted within an appropriate housing material.

In a practical embodiment of the transducer unit illustrated in FIGS. 5A and 5B, a Teflon mandrel section 110 having an outer diameter of 1¾" and an inner diameter of 1¼" was successfully employed. It had a length of approximately 80 inches for a spacing between transducers 25 and 26 of 3' and between transducers 26 and 27 of as much as 3'. Outer housing 122 had embedded therein steel piano wires 1/16" in diameter. The spacing between adjacent turns of each helix was approximately ⅜" and the pitch was 32°, the helices being wound in opposite directions. The housing 122 had a thickness of approximately ⅜".

Obviously, other materials for the mandrel section 110 of appropriate characteristics may be employed as may other materials for the housing 122 be employed. If desired, the reinforcing strands may be of mesh construction or the pitch may be arranged at the critical angle of 54°40' so as to be dimensionally stable with pressure and temperature. In this event, it may be desirable to provide a conventional bellow to accommodate the change in volume of fluid within the housing 122. Of course, reinforcing strands of other materials may be used, such as cotton or nylon, provided that appropriate measures are taken to prevent voids which could cause an attenuation of acoustic signals passing through.

Although this aspect of the present invention has been described in connection with acoustic velocity well logging equipment, the construction of transducer unit 11 may find applications in other environments. For example, the mandrel 110 may support coils in an electromagnetic system for investigating earth formations wherein alternating current is emitted by a transmitter coil and one or more receiver coils are used to derive a resulting induced signal. In this case, both conductive and magnetic materials should be avoided. For example, the reinforcing strands 123 and 124 of enclosure 122 may be constructed of nylon. Thus, as used herein the term "sensing unit" is intended to denote either or both the transmitter or receiver transducers of an acoustic well logging system, the transmitter and receiver coils of an electromagnetic well logging system, or like elements of any other type of well logging apparatus. If desired, equipment responsive to radiant energy may be mechanically coupled to borehole instrument 10, 11. For example, a detector responsive to naturally occurring gamma radiation be used and recorder 50 can be arranged to provide a record of counting rate versus depth. The combination of acoustic velocity and gamma radiation records thus provides extremely valuable information concerning the nature of the formations.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. Apparatus for investigating earth formations traversed by a borehole comprising: means for emitting acoustic wave energy from one location in the borehole; means for intercepting acoustic wave energy at a second location in the borehole and at a third location in the borehole and for deriving corresponding electrical signals; a pair of normally-inoperative signal-translating channels having individual input circuits supplied with the electrical signals responsive to the acoustic energy intercepted at said second and said third locations, respectively; means operative synchronously with the emission of acoustic wave energy in the borehole for operatively conditioning one of said channels at a selected time after the emission of acoustic wave energy and for a predetermined interval of time; means responsive to a signal translated by said one channel for operatively conditioning the other of said channels for a predetermined interval of time; means for deriving indications responsive to signals translated by both of said channels; and selectively operable means for conditioning said one channel for the translation of signals, for effectively disabling said means for emitting acoustic wave energy and for applying repetitive pulses to said input circuits of said signal-translating channels.

2. Apparatus for investigating earth formations traversed by a borehole comprising: a transducer for emitting acoustic wave energy from one location in the borehole; means for supplying repetitive electrical pulses to said transducer; means for intercepting acoustic wave energy at a second location in the borehole and at a third location in the borehole and for deriving corresponding electrical signals; a pair of normally-inoperative signal-translating channels having individual input circuits adapted to be supplied with the electrical signals responsive to the acoustic energy intercepted at said second and said third locations, respectively, said signal-translating channels including individual control circuits; means, operative synchronously with each of the repetitive pulses from said first-mentioned means, for operatively conditioning one of said channels at a selected time after each of said repetitive pulses and for a predetermined interval of time; means responsive to a signal translated by said one channel for operatively conditioning the other of said channels for a predetermined interval of time; means for deriving indications responsive to signals translated by both of said channels; a source of additional electrical repetitive pulses; and means for effectively interrupting pulses supplied to said transducer from said first-mentioned means and for supplying pulses from said source to said input circuit of each of said signal-translating channels.

3. Apparatus for investigating earth formations traversed by a borehole comprising: a transducer for emitting acoustic wave energy from one location in the borehole; a pulser coupled to said transducer for supplying thereto repetitive electrical pulses; a master keyer adapted to be coupled to said pulser for synchronizing the operation thereof; means for intercepting acoustic wave energy at a second location in the borehole and at a third location in the borehole and for deriving corresponding electrical signals; a pair of normally-inoperative signal-translating channels having individual input circuits adapted to be supplied with the electrical signals responsive to the acoustic energy intercepted at said second and said third locations, respectively, each of said signal-translating channels including an individual control circuit and an individual output circuit; means coupled to said master keyer for operatively conditioning one of said channels at a selected time after each pulse from said keyer and during an interval of time; means responsive to a signal translated by said one channel for operatively conditioning the other of said channels during an interval of time; a flip-flop type multivibrator having two input circuits, each coupled to one of said output circuit; means coupled to said multivibrator for deriving indications of a time timing relationship of such signals translated by both of said channels; a source of repetitive electrical pulses; and relay means operable from the surface of the earth for effectively disabling said pulser and for supplying pulses from said source to said input circuit of each of said signal-translating channels.

4. Acoustic velocity logging apparatus for investigating earth formations traversed by a borehole comprising: an elongated housing adapted for passage through a borehole including a support and a tubular member connected to and depending from said support, said tubular member being constructed so as to provide a relatively long period of time for the travel of acoustic energy longitudinally of the tubular member between at least two locations on the tubular member, said period of time being greater than the period of time required for acoustic energy to travel between said two locations and adjacent earth formations, transmitter means on said tubular member for repetitively generating pulses of acoustic energy; means for repetitively actuating said transmitter means; at least first and second receiver means on said tubular member spaced from one another and in one direction from said transmitter means and each responsive to pulses of acoustic energy for developing corresponding electrical signals; a tubular, semirigid, elastic enclosure connected in fluid sealed relation to said support for enclosing said transmitter and receiver means; a bottom closure for said enclosure connected in fluid sealed relationship to the lower extremity of said enclosure and longitudinally spaced from the lower end of said tubular member so that shocks encountered in passage through a borehole are absorbed by said enclosure; first and second pulse generating means in said support coupled respectively to said first and second receiver means, said first pulse generating means being coupled to said actuating means for response to electrical signals from said first receiver means after a predetermined time delay following actuation of said transmitter means and just prior to the earliest arrival of each acoustic pulse therefrom to develop first sharp pulses marking the times of such arrivals, said second pulse generating means being coupled to said first pulse generating means for response to electrical signals from said second receiver means during a predetermined time period following each of said first sharp pulses for generating second sharp pulses marking the earliest arrival of the corresponding acoustic pulse at said second receiver means; and means coupled with said first and second pulse generating means and responsive to said first and second sharp pulses for developing a signal output which varies as a function of the time interval between the earliest arrivals of each generated acoustic pulse at said first and second receiver means.

5. Acoustic velocity logging apparatus for investigating earth formations traversed by a borehole comprising: an elongated housing adapted for passage through a borehole; transmitter means in said housing for generating pulses of acoustic energy; means for repetitively actuating said transmitter means; at least first and second receiver means in said housing spaced from one another and in one direction from said transmitter means and each responsive to pulses of acoustic energy for developing corresponding electrical signals; first and second pulse generating means in said housing continuously coupled respectively to said first and second receiver means, said first pulse generating means being to said actuating means for response to electrical signals from said first receiver means after a predetermined time delay following actuation of said transmitter means and just prior to the earliest arrival of each acoustic pulse therefrom to develop first sharp pulses marking the times of such arrivals, gate means coupled between said first pulse generating means and said second pulse generating means, said gate means operatively conditioning said second pulse generating means for response to electrical signals from said second receiver means during a predetermined period following each of said first sharp pulses for generating second sharp pulses marking the earliest arrival of the corresponding acoustic pulse at said second receiver means; and means in said housing coupled with said first and second pulse generating means and responsive to said first and second sharp pulses for developing a signal output which varies as a function of the time interval between the earliest arrivals of each generated acoustic pulse at said first and second receiver means.

6. Acoustic velocity logging apparatus for investigating earth formations traversed by a borehole comprising: an elongated housing adapted for passage through a borehole; transmitter means in said housing for generating pulses of acoustic energy; means for repetitively actuating said transmitter means; at least first and second receiver means in said housing spaced from one another and in one direction from said transmitter means and each responsive to pulses of acoustic energy for developing corresponding electrical signals; first and second pulse generating means continuously coupled respectively to said first and second receiver means; means coupling said actuating means to said first pulse generating means for delaying operation of said first pulse generating means to render the same responsive to electrical signals from said first receiver means after a predetermined time following actuation of said transmitter means and just prior to the earliest arrival of each acoustic pulse therefrom, said first pulse generating means being responsive to such electrical signals to develop first sharp pulses marking the times of earliest arrival of each acoustic pulse from said transmitter means; gate means coupled between said first pulse generating means and said second pulse generating means, said gate means operatively conditioning said second pulse generating means for response to electrical signals from said second receiver means during a predetermined period following each first sharp pulse for generating second sharp pulses marking the earliest arrival of the corresponding acoustic pulse at said second receiver means; and means in said housing coupled with said first and second pulse generating means and responsive to said first and second sharp pulses for developing a signal output which varies as a function of the time interval between the earliest arrivals of each generated acoustic pulse at said first and second receiver means.

7. Acoustic velocity logging apparatus for investigating earth formations traversed by a borehole comprising: an elongated housing adapted for passage through a borehole; transmitter means in said housing for generating pulses of acoustic energy; means for repetitively actuating said transmitter means; at least first and second receiver means in said housing spaced from one another and in one direction from said transmitter means and each responsive to pulses of acoustic energy for developing corresponding electrical signals; first and second pulse generating means continuously coupled respectively to said first and second receiver means; means coupling said actuating means to said first pulse generating means for delaying operation of said first pulse generating means to render the same responsive to electrical signals from said first receiver means after a predetermined time delay following actuation of said transmitter means and just prior to the earliest arrival of each acoustic pulse therefrom, said first pulse generating means being responsive to such electrical signals to develop first sharp pulses marking the times of earliest arrival of each acoustic pulse from said transmitter means; gating circuit means for coupling said first pulse generating means to said second pulse generating means to render the latter responsive to electrical signals from said second receiver means during a predetermined period following each first sharp pulse for generating second sharp pulses marking the earliest arrival of the corresponding acoustic pulse at said second receiver means; and means in said housing coupled with said first and second pulse generating means and responsive to said first and second sharp pulses for developing a signal output which varies as a function of the time interval between the earliest arrivals of each generated acoustic pulse at said first and second receiver means.

8. Acoustic velocity logging apparatus for investigating earth formations traversed by a borehole comprising: an elongated housing adapted for passage through a borehole; transmitter means in said housing for generating pulses of acoustic energy; means for repetitively actuating said transmitter means; at least first and second receiver means in said housing spaced from one another and in one direction from said transmitter means and each responsive to pulses of acoustic energy for developing corresponding electrical signals; first and second pulse generating means in said housing continuously coupled respectively to said first and second receiver means; signal delaying means in said housing for coupling said actuating means to said first pulse generating means to render the same responsive to electrical signals from said first receiver means after a predetermined time delay following actuation of said transmitter means and just prior to the earliest arrival of each acoustic pulse therefrom, said first pulse generating means being responsive to such electrical signals to develop first sharp pulses marking the times of earliest arrival of each acoustic pulse from said transmitter means; and gating circuit means in said housing for coupling said first pulse generating means to said second pulse generating means to render the latter responsive to electrical signals from said second receiver means during a predetermined period immediately following each first sharp pulse for generating second sharp pulses marking the earliest arrival of the corresponding acoustic pulse at said second receiver means, and means in said housing coupled with said first and second pulse generating means and responsive to said first and second sharp pulses for developing a signal output which varies as a function of the time interval between the earliest arrivals of each generated acoustic pulse at said first and second receiver means.

9. Apparatus for use in a borehole for investigating earth formations traversed by a borehole comprising: a support adapted to be passed through a borehole; a tubular member connected to and depending from said support; said tubular member being constructed so as to provide a relatively long period of time for the travel of acoustic energy longitudinally of said tubular member between at least two locations on the tubular member, said period of time being greater than the period of time required for acoustic energy to travel between said two locations and adjacent earth formations; an acoustic transmitter and receiver means respectively carried by said support and said tubular member and spaced from one another; acoustic baffle means disposed adjacent said transmitter means on the side of the transmitter means in facing relationship to said receiver means for attenuating direct acoustic radiation to said receiver means; a tubular, semirigid elastic enclosure connected in fluid sealed relation to said support and enclosing said tubular member and said acoustic transmitter and receiver means; and a bottom closure for said enclosure connected in fluid sealed relation to the lower extremity of said enclosure.

10. Acoustic velocity logging apparatus for investigating earth formations traversed by a borehole comprising: an elongated housing adapted for passage through a borehole; transmitter means in said housing for generating pulses of acoustic energy; means for repetitively actuating said transmitter means; first and second receiver means in said housing spaced from one another and in one direction from said transmitter means and each responsive to pulses of acoustic energy for developing corresponding electrical signals; first and second pulse generating means in said housing continuously coupled respectively to said means being coupled to said actuating means for response to electrical signals from said first receiver means after a predetermined time delay following actuation of said transmitter means and just prior to the earliest arrival of each acoustic pulse therefrom to develop first sharp pulses marking the times of such arrivals, said second pulse generating means being coupled to said first pulse generating means for response to electrical signals from said second receiver means following each of said first sharp pulses for generating second sharp pulses marking the earliest arrival of the corresponding acoustic pulse at said second receiver means; means coupled with said first and second pulse generating means and responsive to said first and second sharp pulses for developing a signal output which varies as a function of the time interval between the earliest arrivals of each generated acoustic pulse at said first and second receiver means; oscillator means for developing repetitive electrical signals; and switch means for disconnecting said repetitively actuating means from said transmitter means and coupling said oscillator means to said first and second receiver means.

11. Apparatus for use in a borehole for investigating earth formations traversed by a borehole comprising: a support adapted to be passed through a borehole; a tubular member connected to and depnding from said support with a lower free end, said tubular member being constructed so as to provide a relatively long period of time for the travel of acoustic energy longitudinally of said tubular member between at least two locations on the tubular member, said period of time being greater than the period of time required for acoustic energy to travel between said two locations and adjacent earth formations; at least two acoustic transducers carried by said tubular member; a tubular, semirigid, elastic enclosure connected in fluid sealed relation to said support and enclosing said tubular member and said transducers; and a bottom closure for said enclosure connected in fluid sealed relation to the lower extremity of said enclosure and longitudinally spaced from said lower free end of said depending tubular member so that shocks encountered in passage through a borehole are absorbed by said encolsure independent of said tubular member.

12. Apparatus for use in a borehole for investigating earth formations traversed by a borehole comprising: a support adapted to be passed through a borehole; a tubular member constructed of a material having a relatively low acoustic velocity characteristic longitudinally of said member as compared with the velocity of the formations to be investigated and connected to and depending from said support with a lower free end; at least two acoustic transducers spaced from one another and carried by said member; a tubular, semirigid, elastic enclosure constructed of a material having a relatively low acoustic velocity characteristic longitudinally of said member as compared with the velocity of the formations to be investigated and connected in fluid sealed relation to said support and enclosing said transducers; and a bottom closure for said enclosure connected in fluid sealed relation to the lower extremity of said enclosure and longitudinally spaced from said lower free end of said depending tubular member so that shocks encountered in passage through a borehole are absorbed by said enclosure independent of said tubular member.

13. Apparatus for use in a borehole for investigating earth formations traversed by a borehole comprising: a support, adapted to be passed through a borehole; a mandrel connected to and depending from said support with a lower free end, said mandrel having a relatively low acoustic velocity characteristic as compared with the velocity of the formations to be investigated; at least two acoustic transducers spaced from one another and carried by said mandrel; a hollow, semirigid, elastic enclosure connected in fluid sealed relation to said support and enclosing said transducers, said enclosure having a longitudinal axis and including a first, relatively flexible material having a relatively low acoustic velocity characteristic as compared with the velocity of the formations to be investigated and a reinforcing strand of a material having a relatively high acoustic velocity characteristic embedded in said first material and wound in a helix about the longitudinal axis of said enclosure at an angle of pitch such that the acoustic velocity thereof in the direction of said longitudinal axis is relatively low; and a bottom closure for said enclosure connected in fluid sealed relation to the lower extremity of said enclosure and longitudinally spaced from said lower free end of said mandrel so that shocks encountered in passage through a borehole are absorbed by said enclosure independent of said mandrel.

14. Apparatus according to claim 13 further comprising: another reinforcing strand of material having a relatively high acoustic velocity characteristic embedded in said first material and wound in a helix essentially concentric to said first-mentioned helix, but wound in the direction opposite thereto.

(References on following page)

References Cited by the Examiner

UNITED STATES PATENTS

| | | | |
|---|---|---|---|
| 2,190,686 | 2/1940 | Slichter | 181—.5 |
| 2,545,101 | 3/1951 | Meunier | 181—.53 |
| 2,704,364 | 3/1955 | Summers | 181—.531 |
| 2,708,485 | 5/1955 | Vogel | 181—.53 |
| 2,713,147 | 7/1955 | Stripling | 340—18 X |
| 2,722,282 | 11/1955 | McDonald | 181—.53 |
| 2,735,303 | 2/1956 | Haase | 340—7 |
| 2,757,358 | 7/1956 | Ely | 181—33 |
| 2,768,701 | 10/1956 | Summers | 181—.53 |
| 2,790,964 | 4/1957 | Schurman | 340—18 X |
| 2,791,757 | 5/1957 | Blake et al. | 340—7 |
| 2,794,512 | 6/1957 | Martin | 181—.53 |
| 2,813,590 | 11/1957 | McDonald | 181—.53 |
| 2,857,451 | 10/1958 | Barclay | 73—151 |
| 2,868,311 | 1/1959 | Tullos | 181—.53 |
| 2,878,886 | 3/1959 | Overton | 181—.5 |
| 2,918,651 | 12/1959 | Podolak et al. | 181—.5 |
| 2,938,592 | 5/1960 | Charske et al. | 181—.5 |
| 2,949,973 | 8/1960 | Broding et al. | 181—.5 |
| 2,993,553 | 7/1961 | Howes | 181—.5 |

BENJAMIN A. BORCHELT, *Primary Examiner.*

CARL W. ROBINSON, I. LISARRIN, CHESTER L. JUSTUS, SAMUEL FEINBERG, *Examiners.*

M. J. MARNOCK, S. J. TOMSKY, J. W. MILLS, *Assistant Examiners.*